United States Patent [19]

Yamagishi et al.

[11] Patent Number: 5,051,971
[45] Date of Patent: Sep. 24, 1991

[54] PROGRAM EDITING METHOD AND APPARATUS FOR AN INFORMATION RECORDING MEDIUM PLAYING APPARATUS

[75] Inventors: Koji Yamagishi; Naoki Masaki; Nobuaki Hisamatsu, all of Tokorozawa, Japan

[73] Assignee: Pioneer Electronic Corporation, Tokyo, Japan

[21] Appl. No.: 452,827

[22] Filed: Dec. 21, 1989

[30] Foreign Application Priority Data

Dec. 23, 1988 [JP] Japan ............................. 63-327351
Dec. 19, 1989 [JP] Japan ............................. 1-329137

[51] Int. Cl.$^5$ .................................................... G11B 7/00
[52] U.S. Cl. ........................................ 369/32; 369/47; 360/15
[58] Field of Search ............... 369/32, 47, 33, 54, 369/58, 124; 360/13, 15; 352/311, 342

[56] References Cited

U.S. PATENT DOCUMENTS

| | | | |
|---|---|---|---|
| 3,906,169 | 9/1975 | Iwase et al. .................... | 179/100.1 |
| 3,990,710 | 11/1976 | Hughes ............................. | 274/1 R |
| 4,206,483 | 6/1980 | Nakamura ......................... | 360/33 |
| 4,752,920 | 6/1988 | d'Alayer de Costemore d'Arc . | |
| 4,817,075 | 3/1989 | Kitcuchi et al. .................. | 360/15 |

FOREIGN PATENT DOCUMENTS 62-204488 9/1987 Japan .

Primary Examiner—Roy N. Envall, Jr.
Assistant Examiner—Thang V. Tran
Attorney, Agent, or Firm—Fleit, Jacobson, Cohn, Price, Holman & Stern

[57] ABSTRACT

Program editing method and apparatus for an information recording medium playing apparatus for playing an information recording medium carrying a plurality of music pieces and playing time information representing a playing time required for playing each of the plurality of music pieces. The plurality of music pieces are selected in order and a computing process is executed for adding up the playing time of each of the selected music pieces. Then, a provisional combination is produced by editing the selected music pieces excluding one of the selected musical programs when the total playing time obtained by the computing process exceeds a time period previously designated. Furthermore, a combination whose total playing time is the nearest to but shorter than the designated time period is derived by alternately replacing each of the music pieces in the provisional combination with each of music pieces other than the music pieces in the provisional combination. The derived combination is finally determined to be a playing program.

28 Claims, 14 Drawing Sheets

| MUSIC NUMBER | PLAYING TIME | MUSIC NUMBER | PLAYING TIME |
|---|---|---|---|
| 1 | 01:38 | 8 | 04:58 |
| 2 | 03:24 | 9 | 04:20 |
| 3 | 03:14 | 10 | 02:14 |
| 4 | 03:11 | 11 | 02:44 |
| 5 | 05:06 | 12 | 03:54 |
| 6 | 04:16 | 13 | 04:01 |
| 7 | 01:16 | | |

Fig. 4A

| 1 | 2 | 3 | 4 | 5 | 6 | 7 | REMAINDER |
|---|---|---|---|---|---|---|---|
| 1:38 | 3:24 | 3:14 | 3:11 | 5:06 | 4:16 | 1:16 | |

| 8 | 9 | 10 | 11 | 12 | 13 | REMAINDER |
|---|---|---|---|---|---|---|
| 4:58 | 4:20 | 2:14 | 2:44 | 3:54 | 4:01 | |

| 8 | 2 | 3 | 4 | 5 | 6 | 7 | OVERFLOW |
|---|---|---|---|---|---|---|---|
| 4:58 | 3:24 | 3:14 | 3:11 | 5:06 | 4:16 | 1:16 | |

| 9 | 2 | 3 | 4 | 5 | 6 | 7 | OVERFLOW |
|---|---|---|---|---|---|---|---|
| 4:20 | 3:24 | 3:14 | 3:11 | 5:06 | 4:16 | 1:16 | |

| 10 | 2 | 3 | 4 | 5 | 6 | 7 | REMAINDER |
|----|---|---|---|---|---|---|-----------|
| 2:14 | 3:24 | 3:14 | 3:11 | 5:06 | 4:16 | 1:16 | |

| 13 | 2 | 3 | 4 | 5 | 6 | 7 | OVERFLOW |
|----|---|---|---|---|---|---|----------|
| 4:01 | 3:24 | 3:14 | 3:11 | 5:06 | 4:16 | 1:16 | |

| 1 | 8 | 3 | 4 | 5 | 6 | 7 | OVERFLOW |
|---|---|---|---|---|---|---|----------|
| 1:38 | 4:58 | 3:14 | 3:11 | 5:06 | 4:16 | 1:16 | |

| 1 | 13 | 3 | 4 | 5 | 6 | 7 | REMAINDER |
|---|----|---|---|---|---|---|-----------|
| 1:38 | 4:01 | 3:14 | 3:11 | 5:06 | 4:16 | 1:16 | |

| 1 | 2 | 3 | 13 | 5 | 6 | 7 | REMAINDER |
|---|---|---|----|---|---|---|-----------|
| 1:38 | 3:24 | 3:14 | 4:01 | 5:06 | 4:16 | 1:16 | |
| ← 22:55 → | | | | | | | ← 0:05 → |

Fig. 12

| 1 | 2 | 3 | 13 | 5 | 9 | 7 | REMAINDER |
|---|---|---|----|---|---|---|-----------|
| 1:38 | 3:24 | 3:14 | 4:01 | 5:06 | 4:20 | 1:16 | |
| ← 22:59 → | | | | | | | ← 0:01 → |

Fig. 13A

| 1 | 2 | 3 | 5 | 7 | 9 | 13 | REMAINDER |
|---|---|---|---|---|---|----|-----------|
| 1:38 | 3:24 | 3:14 | 5:06 | 1:16 | 4:20 | 4:01 | |
| ← 22:59 → | | | | | | | ← 0:01 → |

Fig. 13B

| 4 | 6 | 8 | 10 | 11 | 12 | REMAINDER |
|---|---|---|----|----|----|-----------|
| 3:11 | 4:16 | 4:58 | 2:14 | 2:44 | 3:54 | |
| ← 21:17 → | | | | | | ← 1:43 → |

PROGRAM EDITING METHOD AND APPARATUS FOR AN INFORMATION RECORDING MEDIUM PLAYING APPARATUS

BACKGROUND OF THE INVENTION

1. Field of the Invention

The present invention relates to a method and apparatus for editing a program for an information recording medium playing apparatus.

2. Description of Background Information

As an information recording medium, there is a digital audio disc generally called "compact disc". The recording area of such a digital audio disc is divided into three areas, namely, the lead-in area, program areas, and lead-out area, from the inner radial limit of the recording area. In the read-in area, there is recorded a data group generally called TOC (the disc's Table Of Contents) which includes data indicating how many music programs, or music pieces, there are, how long each music piece lasts, their starting addresses (positions on the disc), and total playing time. Audio information is recorded in the program areas following the lead-in area, and a signal indicating the end of audio information is repeated throughout the lead-out area.

For playing music pieces recorded on such a digital audio disc, i.e. information recording medium, disc players, i.e. information recording medium playing systems, having a function called "random memory selecting function" or "programmed selecting function" have been already developed. Such information recording medium playing systems are structured to edit a playing program determining in what sequence music pieces are to be played, according to music number data input through manual operation using a keyboard, for example. The playing systems are structured to perform, in accordance with the sequence designated by the playing program, operations of selecting a music piece in turn and playing the selected music piece, so that only designated music pieces are played automatically in the programmed sequence.

With such a programmed selecting function of conventional information recording medium playing devices, music pieces recorded on a recording medium such as a digital audio disc can be arbitrary combined for recording on a magnetic tape. In order to avoid a situation that the music piece recorded at an end portion of the magnetic tape intermits at the tape end, it has been necessary for the user of the information recording medium playing apparatus to previously determine which of the music pieces on the recording medium can be recorded on the magnetic tape using information such as the length of the magnetic tape, and the playing time of each music piece, and previously designate the sequence of music pieces to be played. As mentioned above, there has been a drawback that complicated operations are necessary for editing music pieces in the case of the conventional information recording medium playing apparatuses.

For alleviating the difficulty in editing music pieces, an information recording medium playing apparatus has been invented and disclosed in Japanese Patent Application Laid Open No. P62-204488, in which a playing program, including only music pieces which can be played in a designated time period, is edited in response to a command, and the playing operation of the apparatus is performed in accordance with such a playing program.

However, in the case of this prior art information recording medium playing apparatus, if the total playing time obtained by adding up the playing time of each music piece exceeds the designated time period, then the apparatus produces a playing program including only music pieces respectively corresponding to playing times excluding a playing time which has been added lastly. Therefore, if the playing time added lastly is long, the magnetic tape on which the edited music pieces are recorded will have a long silent portion, or no signal portion, in the end portion of the magnetic tape.

OBJECT AND SUMMARY OF THE INVENTION

The present invention is based on the recognition of the drawback of the prior art program editing method described above, and an objective of the present invention is to provide program editing method and apparatus for an information recording medium playing apparatus which can shorten the silent portion formed in the end part of the magnetic tape when the music pieces on the recording medium are edited and recorded on the magnetic tape.

The program editing method and apparatus for an information recording medium playing apparatus according to the present invention are configured to perform operations of selecting a plurality of music pieces in order and executing a computing process of adding up the playing time of each of the selected music pieces, editing the selected music pieces to produce a provisional combination excluding one of the selected musical programs when the total playing time obtained by the computing operation exceeds a designated time period, deriving a combination whose total playing time is the nearest to but shorter than the designated time period by alternately replacing each of the music pieces in the provisional combination with each of music pieces other than the music pieces in the provisional combination, and determining the derived combination to be a playing program, that is, the music pieces to be played.

BRIEF DESCRIPTION OF THE DRAWINGS

FIGS. 4A, 4B, 5 through 12, 13A and 13B are diagrams showing a process by which the music pieces recorded on the disc are edited to produce a playing program;

DETAILED DESCRIPTION OF A PREFERRED EMBODIMENT

The embodiment of the present invention in a CD player will be specifically described with reference to the accompanying drawings.

Figures 1, 3:
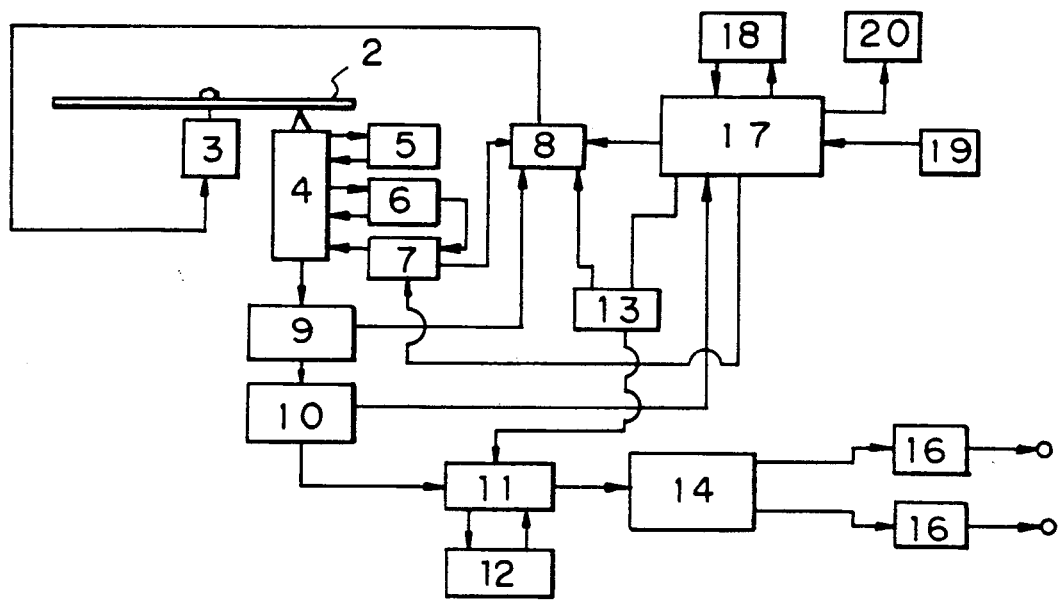
FIG. 1 is a block diagram showing an embodiment of the present invention.
FIG. 3 is a diagram showing the music number and the playing time of music pieces recorded on the disc.

In FIG. 1, information recorded on a digital audio disc 2, which is driven by a spindle motor 3, is read by an optical pickup 4. In the optical pickup 4, various components such as a laser diode, an objective lens, a focus actuator, a tracking actuator, and photo detectors, are incorporated. Output signals of the pickup 4 are respectively supplied to a focus servo circuit 5, a tracking servo circuit 6, and a phase comparator circuit 9 including an RF amplifier. In the focus servo circuit 5, a focus error is derived, and the focus actuator in the pickup is driven in accordance with the amount of the derived focus error. In the tracking servo circuit 6, a tracking error is derived, and the error component is supplied to the tracking actuator in the pickup and also to a pickup transport servo circuit 7. By the output signal of the pickup transport servo circuit 7, the pickup 4 is moved in a radial direction of the disc 2.

A reproduced clock signal is derived in the phase comparator circuit 9, and supplied to the spindle servo circuit 8. In the spindle servo circuit 8, a phase difference between the reproduced clock signal and a reference clock signal from a clock generating circuit 13 is detected, and the spindle motor 3 is driven so that the linear velocity of the track of the disc 2 is maintained constant. The output signal of the phase comparator circuit 9 is supplied to an EFM (Eight to Fourteen Modulation) demodulating circuit 10 including a frame sync circuit. The demodulated output signal is in turn processed in a data processing circuit 11 which performs operations such as the de-interleaving of the demodulated data signal, the error detection, the error correction, and the correction of data. Subsequently, the demodulated signal is temporarily stored in a data memory 12, read-out by using a clock signal of a constant frequency supplied from a clock generating circuit 13, and converted to an analog signal at a D/A (digital to analog) converter 14. Output signals of the D/A converter 14 are supplied to output terminals through LPFs (Low Pass Filters) 16 as the left and right audio signals.

A control signal contained in data issued from the demodulating circuit 10 is supplied to a system controller 17. The system controller 17 is configured to retrieve various information such as information in the lead-in area representing the TOC, information in the program areas representing the position within a music piece, the pause between two music pieces, the music piece number, and the absolute time at the present playing position. The system controller 17 comprises one or more microcomputers, and in accordance with the key operation in an operating part 19 or data written in predetermined areas of a RAM 19 the system controller 17 executes various operations such as the supply of data to a display device 20 and the supply of various commands to the pickup transport servo circuit 7 and the spindle servo circuit 8. Furthermore, the operating part 19 has a key for issuing an edit command, and ten-keys for designating a time period for playing operation, and music pieces to be played.

In the microcomputer constituting the system controller 17 in the arrangement described above, the processor which is operated by the computer program previously stored in a ROM (read only memory) executes the following processes.

Referring now to FIG. 2, when an interruption requiring signal by a timer for example is generated during the execution of a main routine, the processor proceeds to step S1 in which the processor reads the TOC recorded in the lead-in area of the disc 2, and writes it into the RAM 18. Then, the processor detects the number N of the music pieces recorded on the disc 2 and the playing time Yn of each of the music programs by using the TOC (step S2), and writes them into the RAM 18 (step S3). Subsequently, the processor judges whether or not the edit command is issued by the key operation in the operating part 19 (step S4).

If it is judged in step S4 that the edit command has not been issued, the processor then judges whether or not a play command is issued (step S5). If it is judged in step S5 that the play command has not been issued, the processor proceeds to step S4 again. Conversely, if it is judged in step S5 that the play command has been issued, the processor calls a subroutine for controlling the playing operation (step S6).

If it is judged in step S4 that the edit command has been issued, the processor retrieves data designating the playing time and writes it into the RAM 18 (step S7). Then, the processor calls an edit process subroutine for editing a program, i.e. a combination, for playing music pieces in which the processor executes a computing operation of adding up the playing time of each music program in the order of program number from the playing time of a music piece of a designated program number or from the playing time of the first music piece of the disc, and determining music pieces to be played, respectively corresponding to playing times excluding a playing time added lastly from playing times which collectively form a total playing time obtained by adding up the playing times until the value obtained by the computing operation exceeds the designated playing time. The details of the edit process subroutine will be described later.

After the execution of the step S8, the processor stores into the RAM 18 data representing a residual time $t_1$ of a provisional program PA obtained by step S8, that is, the length of the silent portion which will be formed at the end portion of the side A of a magnetic tape when the music pieces included in the program for recording in the side A are recorded on the magnetic tape, and also representing a residual time $t_2$ of a provisional program PB obtained by step S8, that is, the length of the silent portion which will be formed at the end portion of the side B of the magnetic tape when the music pieces included in the program for recording in the side B are recorded on the magnetic tape (step S9). Then, the processor writes data representing the provisional programs PA and PB into the RAM 18 (step S10), and judges whether or not the number of music pieces in the provisional program PA is smaller than the total number N of the music pieces (step S11).

If it is judged in step 11 that the number of the music pieces in the provisional program PA is not smaller than the total number of music pieces N, then the processor restarts the execution of the operation which was being executed immediately before the processor shifted to step S1. Conversely, if it is detected in step S11 that the number of the music pieces in the provisional program PA is smaller than the total number of music pieces N, the processor writes into the RAM 18 data representing music pieces $P_1$ through $P_x$ which are not included in the provisional program PA, and also the total number X of the music pieces $P_1$ through $P_x$ (step S12). Then, the processor judges whether or not the number X is equal to zero (step S13). If it is judged in step S13 that the number X is not equal to zero, then the processor judges whether or not the playing time of any one of the music pieces $P_1$ through $P_x$ is shorter than a time period $t_1$ (step S14).

If it is detected in step S14 that the playing time of any one of the music pieces $P_1$ through $P_x$ is shorter than $t_1$, the processor adds the music piece of the playing time shorter than $t_1$ among the music pieces $P_1$ through $Px$ to the provisional program PA stored in the RAM 18 (step S15), and subtracts a value 1 from the number X of the music pieces (step S16).

After the execution of the step S16, the processor makes the count value C equal to zero (step S25). When it is detected in step S13 that the number X of the music pieces is zero, or when it is detected in step S14 that none of the music pieces $P_1$ through $Px$ has a playing time shorter then $t_1$, the processor immediately proceeds to step S25.

Subsequent to the execution of the step S25, the processor stores the number L of the music pieces in the provisional program PA, and the number m of music pieces which are not included in the provisional program PA (step S26). Then, the processor makes the count value q equal to 1 (step S27), and makes the count value r equal to 1 (step S28). After these operations, the processor produces a program by replacing a "q"th music piece Aq of the music pieces stored as the element of the provisional program PA with an "r"th music piece $(B+P)r$ of the music pieces which are not included in the provisional program PA, and stores the produced program as a program PAq (steps S29 and S30). Then, the processor computes a residual time of the program PAq, and stores it (step S31). Subsequently, the processor adds 1 to the count value r (step S32), and judges whether or not the count value r has become equal to the number of music pieces $m+1$ (step S33).

If it is judged in step S33 that the number r is not equal to the number of music pieces $m+1$, the processor proceeds to step S29 again. Conversely, if it is detected in step S33 that the number r has become equal to the number of music pieces $m+1$, the processor adds 1 to the count value q (step S34), and judges whether or not the count value q has become equal to the number of music pieces $L+1$ (step S35).

If it is detected in step S35 that the count value q is not equal to $L+1$, then the processor proceeds to Step S28 again. Conversely, if it is detected in step S35 that the count value q has become equal to $L+1$, the processor selects a program PAQ having the shortest residual time among a group of programs having been stored as the program PAq, and in turn loads the program PAQ in a predetermined region of the RAM 18 (step S36). After the execution of the step S36, the processor removes the music pieces, which have been stored as the music pieces of the provisional program PA, from the provisional program PB, and adds music pieces in the provisional program PA which are not included in the program PAQ to the provisional program PB (step S37). Then, the processor adds 1 to the count value C (step S38), and judges whether or not the count value C has become equal to 3 (step S39).

If it is judged in step S39 that the count value C is not equal to 3, the processor proceeds to step S29 again. Conversely, if it is detected in step S39 that the count value C has become equal to 3, the processor changes the arrangement of music pieces constituting the provisional programs PA and PB in accordance with the music number, and makes the provisional program PA to be the playing program (step S40). Then, the processor judges whether or not the number of music pieces X is equal to zero (step S41).

If it is detected in step S41 that the number of music pieces X is equal to zero, the processor restarts the execution of the routine which was being executed immediately before the processor proceeded to step S1. Conversely, if it is detected in step S41, that the number of music pieces X is not equal to zero, the processor then computes a residual time $t_2$ of the provisional program PB, and stores it (step S42). Then the processor judges whether or not the playing time of any one of the music pieces $P_1$ through $Px$ is shorter than the time period $t_2$ (step S43). If it is detected in step S43 that the playing time of any one of the music pieces $P_1$ through $Px$ is shorter than $t_2$, the processor adds the music piece of the playing time shorter than $t_2$ among the music pieces $P_1$ through $Px$ to the provisional program PB (step S44), and subtracts a value 1 from the number X of the music pieces (step S45). Subsequently, the processor judges whether or not the number of music pieces X has become equal to zero (step S46).

If it is detected in step S46 that the number of music pieces X has become equal to zero, the processor changes the arrangement of music pieces constituting the provisional program PB in accordance with the music number, and makes the provisional program PB to be the playing program (step S47). Then, the processor restarts the execution of the routine which was being executed immediately before the processor proceeded to step S1. If it is detected in step S46 that the number of music pieces X is not equal to zero, the processor makes the count value C equal to zero (step S51). When it is detected in step S43 that none of the music pieces $P_1$ through $Px$ has a playing time shorter then $t_2$, the processor immediately proceeds to step S51.

Subsequent to the execution of the step S51, the processor computes the number k of the music pieces in the provisional program PB, stores the number k, and makes the count value q equal to 1 (step S53), and makes the count value r equal to 1 (step S54). After this operation, the processor produces a program by replacing a "q"th music piece Bq of the music pieces stored as the element of the provisional program PB with an "r"th music piece Pr of the music pieces $P_1$ through $Px$, and stores the produced program as a program PBq (steps S54 and S55). Then, the processor computes a residual time of the program PBq, and stores it (step S56). Subsequently, the processor adds 1 to the count value r (step S57), and judges whether or not the count value r has become equal to the number of music pieces $X+1$ (step S58).

If it is judged in step S58 that the number r is not equal to the number of music pieces $X+1$, the processor proceeds to step S54 again. Conversely, if it is detected in step S58 that the number r has become equal to the number of music pieces $X+1$, the processor adds 1 to the count value q (step S59), and judges whether or not the count value q has become equal to the number of music pieces $k+1$ (step S60).

If it is detected in step S60 that the count value q is not equal to $k+1$, then the processor proceeds to Step S54 again. Conversely, if it is detected in step S60 that the count value q has become equal to $k+1$, the processor selects a program PBQ having the shortest residual time among a group of programs having been stored as the program PBq, and in turn loads the program PBQ (step S61). After the execution of the step S61, the processor removes the music pieces, which have been stored as the music pieces of the provisional program PB, from music pieces $P_1$ through $Px$, and adds music pieces in the provisional program PB which are not included in the program PBQ to music pieces $P_1$ through Px (step S62). Then, the processor adds 1 to the count value C (step S63), and judges whether or not the count value C has become equal to 3 (step S64).

If it is judged in step S64 that the count value C is not equal to 3, the processor proceeds to step S52 again. Conversely, if it is detected in step S64 that the count value C has become equal to 3, the processor changes the arrangement of music pieces constituting the provisional program PB in accordance with the music number, and makes the provisional program PB to be the playing program (step S65). Then, the processor restarts the execution of the routine which was being executed immediately before the processor proceeded to step S1.

In the process described above, the provisional program whose order of music pieces has been changed at step S40, S47, or S65 is made to be the playing program. However, it is also possible to use the provisional program immediately before the change of order of music pieces at step S40, S47, or S65 as the playing program. Furthermore, a program having the smallest residual time is selected from the group of programs stored as the program PAq or PBr, and stored in the predetermined region of the RAM 18 in step S36 or S61. However, it is also possible to replace this process with the following process in which, the residual time is computed immediately after the programs PAq and PBq are produced in step S29 and S54 respectively. Then, the present value and a previous value of the residual time are compared, and the smaller one of the residual times and the program corresponding to the smaller residual time are held. The operations after the step S32 and S57 are executed subsequently, so that only a program having the shortest residual time among the program group PAq (PBq) is held immediately before step S36 (step S61). Thus, it is only necessary to store the program having been held into the predetermined region of the RAM 18 in steps S36 and S61 in this case.

The function of the above-described procedure will be explained by way of an example in which music pieces of a disc whose total number of music pieces is 13, and whose total playing time is 44 minutes 18 seconds as shown in FIG. 3, are recorded on a magnetic tape having the recording time of 46 minutes, with reference to FIGS. 4 through 13.

When the edit command is issued by the key operation in the operating part 19, and 23 minutes is input as the designated time period, provisional programs PA and PB respectively shown in FIGS. 4A and 4B are formed by the operations in steps S4, S7 and S8.

In this case, the steps after step S12 will be executed because the number of music pieces of the provisional program PA (=7) is to be judged in step S11 smaller than the total number of music pieces N (+13). Through steps S12 and S13, the number of music pieces which are not edited into the program is judged to be zero, so that the steps S14 through S16 will not be executed. Instead, the steps after step S25 will be executed.

After the initial setting of the count values and other parameters in steps S25 through S28, a program shown in FIG. 5 is produced by replacing a "q"th (q=1) music piece Aq of the provisional program PA with an "r"th (r=1) music piece (of the music number 8) of the music pieces which are not included in the provisional program PA i.e. the provisional program PB in this case, and stored as the program PAq. Then, the residual time (in this case the total of the playing times of the programmed music pieces exceeds the designated time) is computed and in turn stored.

Subsequently, the value 1 is added to the count value r, and the judgement as to whether or not the obtained value has become equal to the number of music pieces m+1 (m+1=7) is made, through steps S32 and S33. By the second execution of the steps S29 through S32, a program shown in FIG. 6 obtained by replacing the "q"th (q=1) music piece of the provisional program PAq with the "r"th (r=2) music piece (of the music number 9) of the provisional program PB is stored, and the residual time (in this case the total of the playing times of the programmed music pieces exceeds the designated time) is computed and in turn stored.

Then, the value 1 is added to the count value r in steps S32 and S33, and the judgement as to whether or not the obtained value r is equal to the number of music pieces m+1 (=7) is made, and the steps S29 through S31 are executed again.

As a result, a program shown in FIG. 7 obtained by replacing the "q"th (q=1) music piece of the provisional program PAq with the "r"th (r=3) music piece (of the music number 10) of the provisional program PB is stored as the program PAq, and the residual time (19 seconds) is computed and in turn stored.

Subsequently, the operations in step S29 through S31 are executed repeatedly. By the sixth execution of the steps S29 through S31, such a program as shown in FIG. 8 is stored as the program PAq, and the residual time (in this case the total of the playing times of the programmed music pieces exceeds the designated time period) is computed and stored.

After these operations, when the number r has become equal to 7 in step S32, the operations in steps S34 and S35 are executed, and the value 1 is added to the count value q. Then, the judgment as to whether or not the obtained value has become equal to the number of music pieces L+1 (=8) is made. Depending on the result of this judgment, the operations in steps S28 through S31 will be executed again.

As a result, a program shown in FIG. 9 produced by replacing a "q"th (q=2) music piece Aq of the provisional program PA with an "r"th (r=1) music piece (of the music number 8) of the provisional program PB is stored as the program PAq, and the residual time (in this case the total of the playing times of the programmed music pieces exceeds the designated time) is computed and in turn stored.

Subsequently, the operations in steps S29 through S31 are repeated by the operations in steps S32 and S33. By the second execution of the steps S29 through S32 after the value q has become equal to two (q=2), a program shown in FIG. 10 is stored as the program PAq, and the residual time (16 seconds) is computed and in turn stored.

Then, the operations in step S28 through S33 are executed repeatedly by the operations in steps S34 and S35, so that six programs obtained by replacing the third music piece of the provisional program Pa with each of the first to sixth music pieces of the provisional program PB, six programs obtained by replacing the fourth music piece of the provisional program Pa with each of the first to sixth music pieces of the provisional program PB, six programs obtained by replacing the fifth music piece of the provisional program Pa with each of the first to sixth music pieces of the provisional program PB, six programs obtained by replacing the sixth music piece of the provisional program Pa with each of the first to sixth music pieces of the provisional program PB, six programs obtained by replacing the seventh music piece of the provisional program Pa with each of the first to sixth music pieces of the provisional program PB, are obtained, and the residual times of all the programs obtained are computed and stored.

Subsequently, by the operation in step S36, the program having the shortest residual time as shown in FIG. 11 among the group of programs stored as the program PAq is loaded as the provisional program PA.

Then, by the operation in step S37, music pieces obtained by excluding the music pieces loaded as the music pieces of the provisional program PA from all of the music pieces of the provisional programs PA and PB are stored as the provisional program PB. The operations in steps S26 through S37 are executed twice by the operation in steps S38 and S39, whereby music pieces are exchanged between the provisional programs PA and PB so that the residual time of the provisional program PA becomes the smallest. As a result, a provisional program shown in FIG. 12 will be obtained. Then the arrangement of the music pieces constituting the provisional programs PA, PB is altered in accordance with the order of the music number, so that two playing programs respectively shown in FIG. 13A and 13B are obtained.

After these operations, if it is detected that there is any music piece which is not programmed in the music pieces $P_1$ through $Px$, by the judgement of the value of the number of music pieces X of music pieces in the music pieces P1 through Px which are not programmed which is executed in step S41, the operations in step S42 through S65 will be executed. In steps S42 through S65, the exchange of music pieces between the provisional program PB and the music pieces $P_1$ through Px is performed so that the residual time of the provisional program PB becomes the smallest, in the same procedure as the steps S26 through S39. In the case of the disc shown in FIG. 3, the procedure terminates without executing the operations in steps S42 through S65 since there will be no music piece which is not programmed, in the music pieces $P_1$ through Px.

Figure 14A:
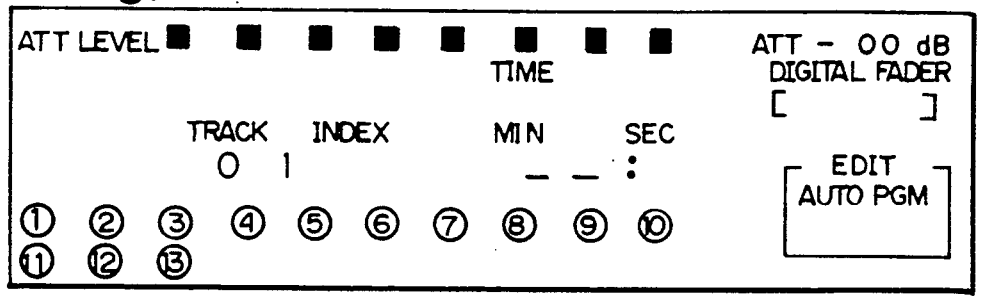
FIGS. 14A through 14D are diagrams showing displaying manners of the display device 20.
Figure 14B:
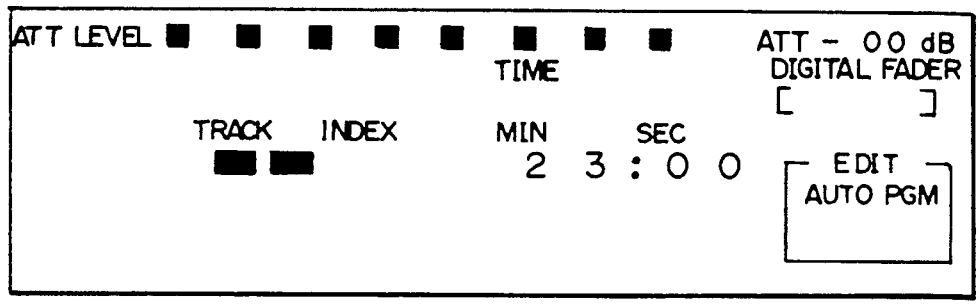
Figure 14C:
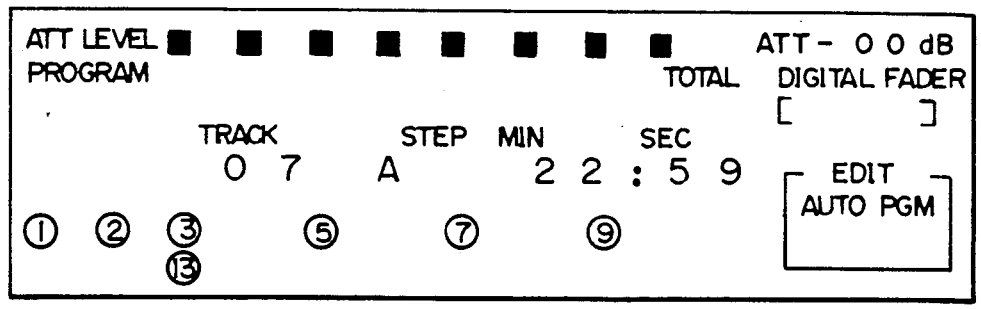
Figure 14D:
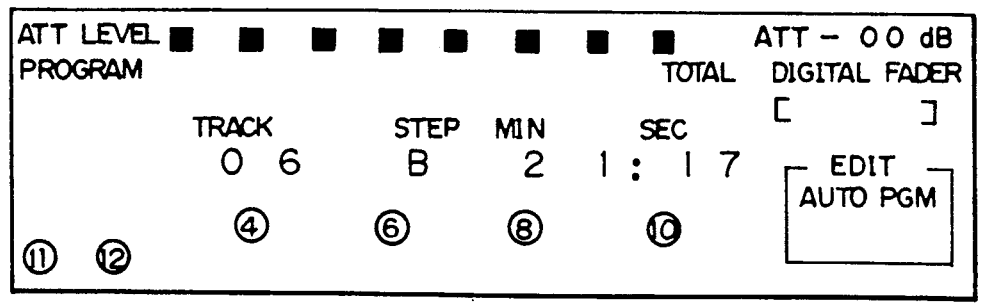

In the embodiment described above, there was not any step for sending an instruction to the display device. However, it is conceivable to insert, after the step S4 of the flow chart of FIG. 2A, a step for supplying an instruction of displaying the mode (AUTO PGM) and the music numbers (1 through 13) of the music pieces recorded on the disc, to the display device 20. Similarly, after step S7, a step for supplying an instruction of displaying the designated recording time (23:00) and music numbers varying at high speed as illustrated in FIG. 14B to the display device 20 may be inserted. Furthermore, after steps S47 and S65, a step for supplying an instruction of displaying the number (07) of the music pieces recorded on the side A of the magnetic tape and the playing time (22:59) as illustrated in FIG. 14C, to the display device 20 for three seconds, and a step for supplying an instruction of displaying the number (06) of the music pieces recorded on the side B of the magnetic tape and the playing time (21:17) as illustrated in FIG. 14D, to the display device 20 for three seconds, may be inserted.

Figure 2A:
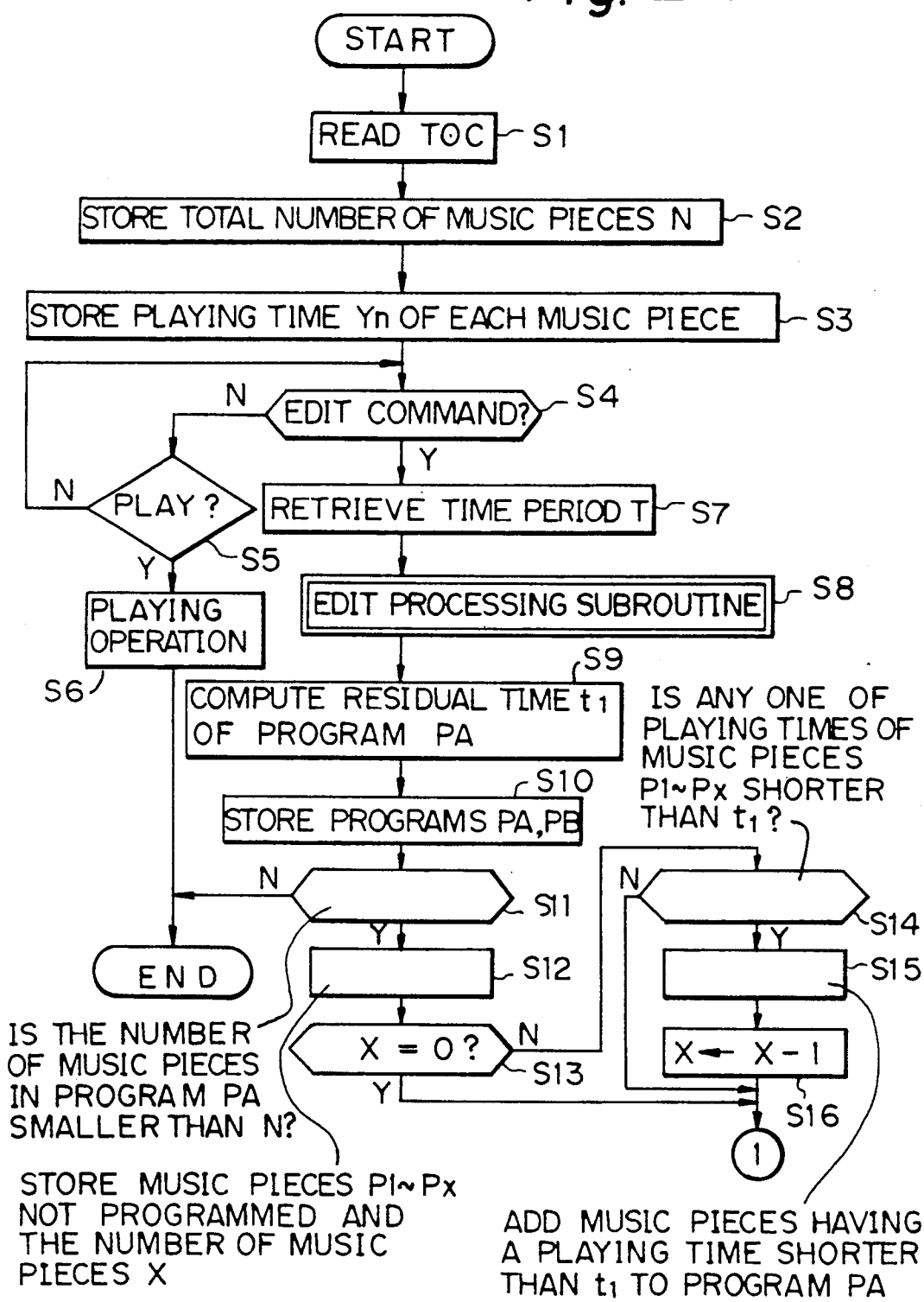
FIGS. 2A through 2D are flowcharts showing the operation of the processor in the arrangement shown in FIG. 1.
Figure 2B:
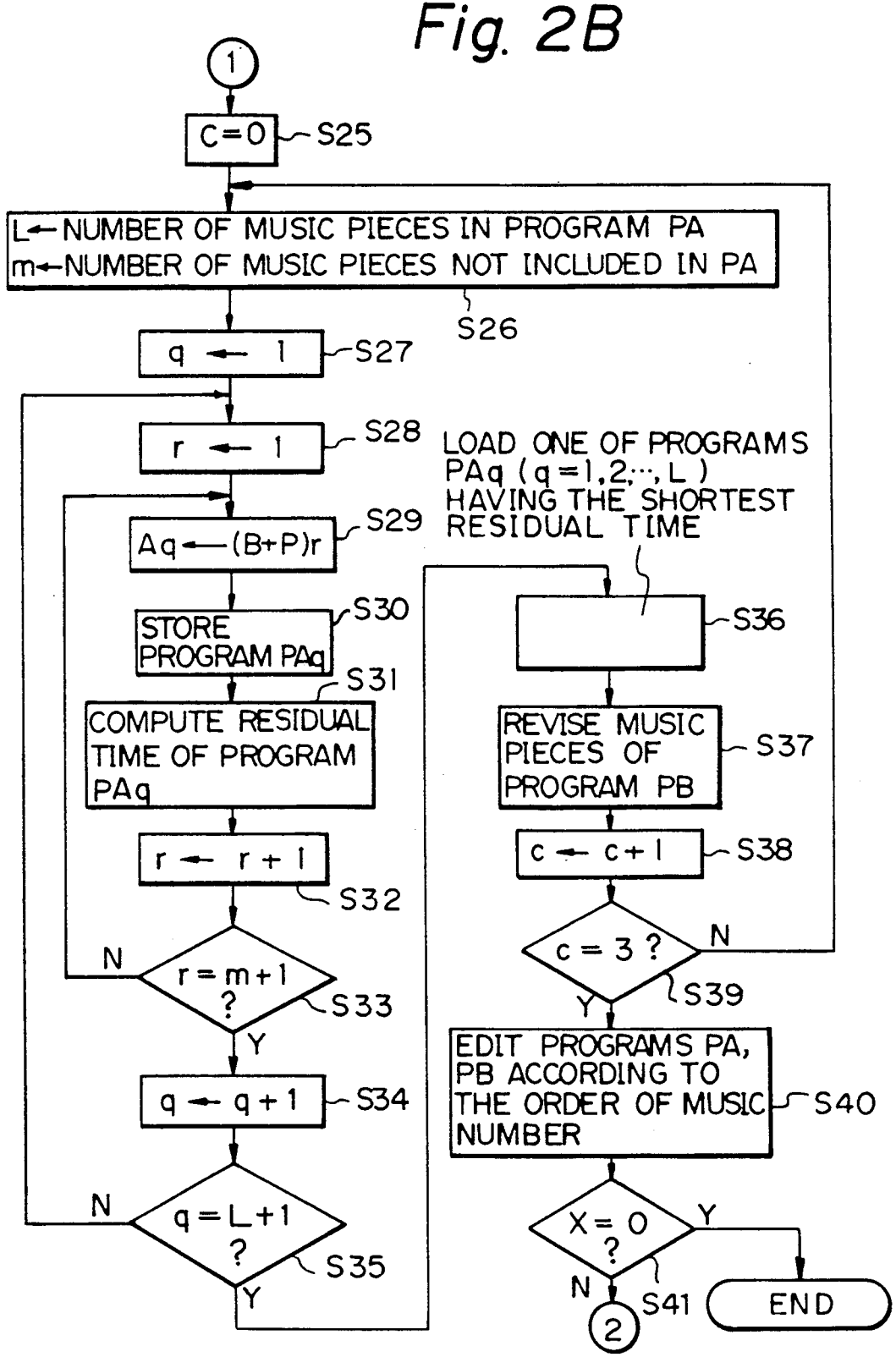
Figure 2C:
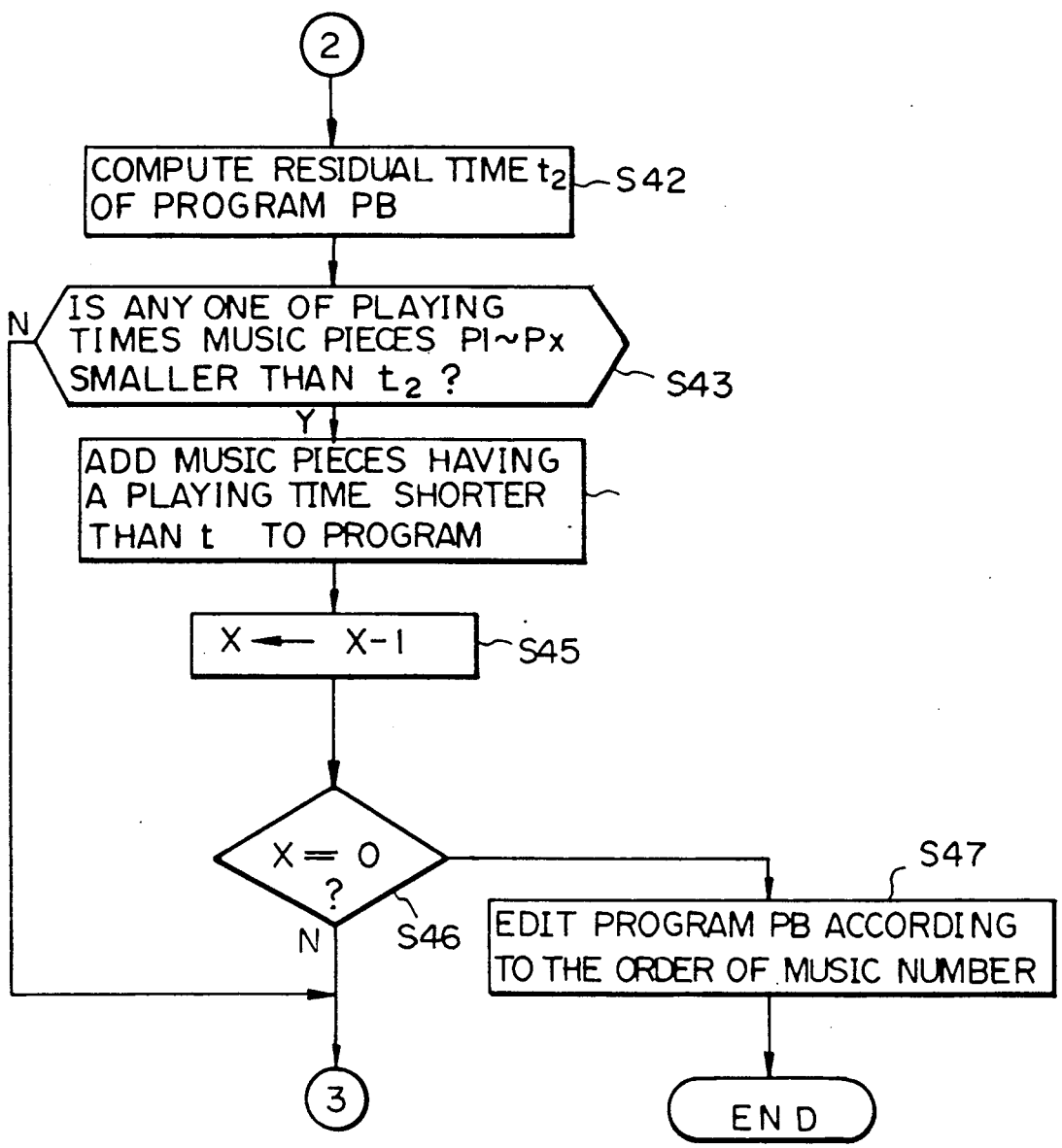
Figure 2D:
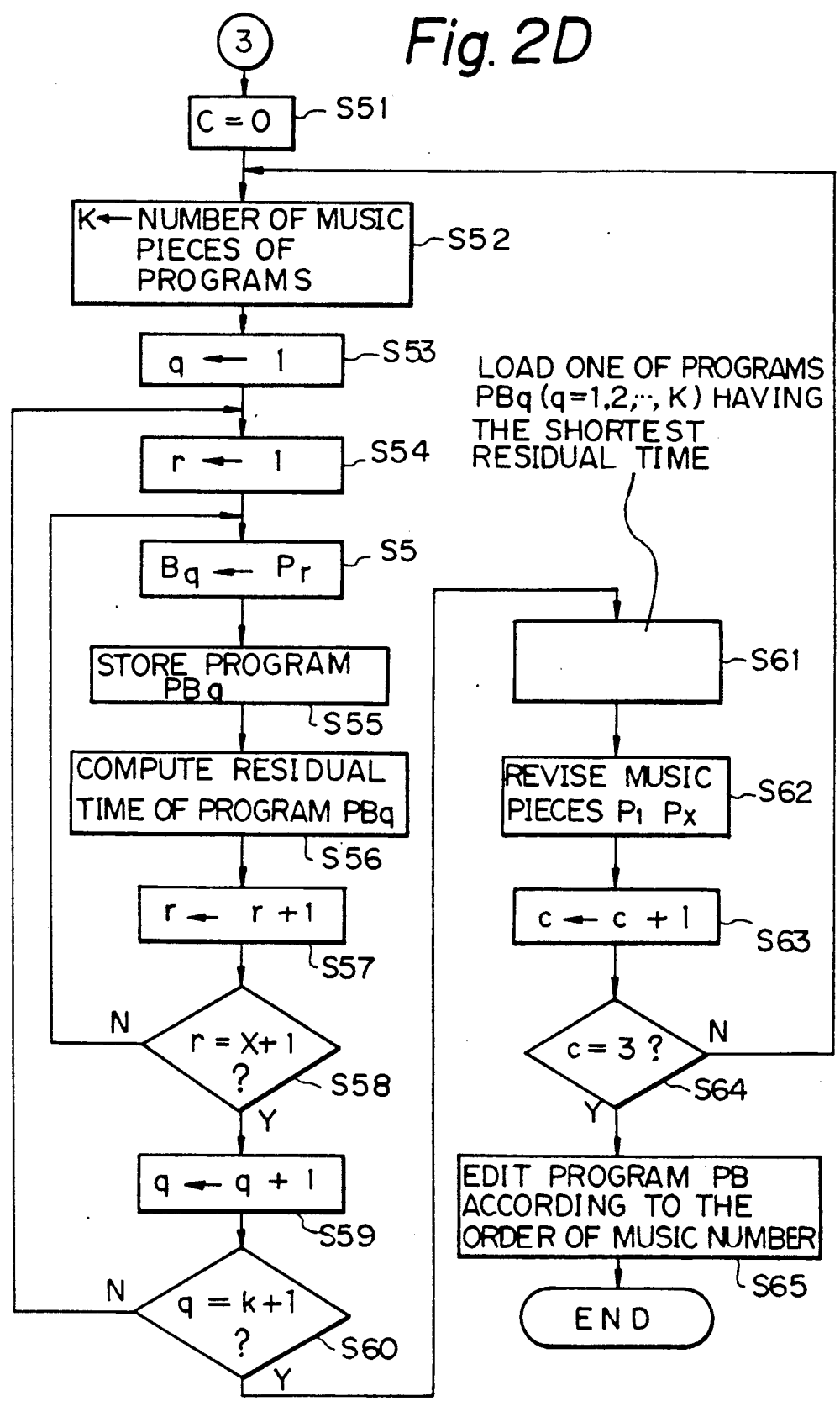

In the foregoing description, the subroutine called at step S8 of the flowchart shown in FIG. 2A was assumed to be such that the playing times are added up in the order of the music number. However, this subroutine may be such that the playing times are added up in the order of the playing time, e.g. longer one of playing times is added in earlier order, or shorter one of playing times is added in earlier order. In the case where the playing times are added up in a manner that longer one of the playing times is added in earlier order, the most appropriate one of combinations having the smallest number of music pieces can be obtained. Conversely, in the case where shorter one of the playing times is added in earlier order, the most appropriate one of combinations having the largest number of music pieces can be obtained.

Furthermore, it is also conceivable to add up the playing times in an order set randomly, or in a predetermined order of priority, e.g. the disc player may be devised so that a degree of wish for the playing of each music piece (0% for the case where the playing is not wished, 100% for the case where the playing is strongly wished) can be previously input by key operations, and the playing times are added up in the order of the degree of desire for the playing of each music piece. In the latter case of adding up the playing times in the order of priority, it is desirable to consider the priority also in exchanging a music piece in the provisional program and a music piece not included in the provisional program. For example, it is preferable to retain in the provisional program music pieces whose degree of wish for the playing is 100%, and to exclude from the provisional program music pieces whose degree of wish for the playing is 0%.

Referring to the flowcharts of FIGS. 15 through 18, the above-mentioned examples of the provisional program editing subroutine which is called in step S8 of the flowchart shown in FIG. 2A will be explained.

Figure 15:
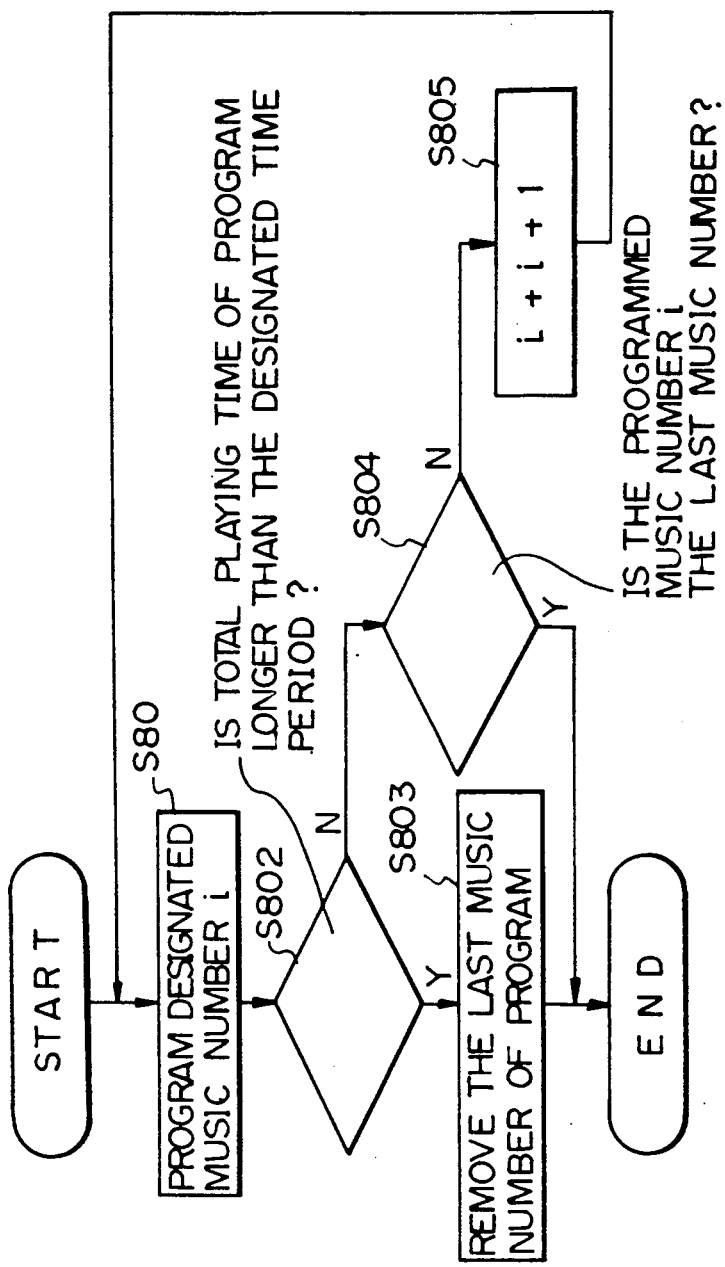
FIGS. 15 through 19 are flowcharts showing various procedures of producing a provisional program.

In FIG. 15, when the provisional program setting subroutine is called the processor sets the first music number in the disc 2 as a designated music number 1, and writes the designated music number i in a program area of the RAM 18 (step S801). Then the processor judges whether or not the summation of the playing times required for playing the music pieces of the music numbers written in the program area of the RAM 18 is longer than the designated time (step S802). If it is judged that the summation of the playing times is longer than the designated time by the execution of the step S802, the processor removes the last one of the music pieces of the program written in the program area (step S803), and restarts the execution of the main routine. Conversely, if it is judged in step S802 that the summation of the playing times is equal to or shorter than the designated time, the processor judges whether or not the designated music number written in the program area is identical with the last music number of the disc 2 (step S804). If it is judged, by the execution of the step S804, that the designated music number is not identical with the last music number of the disc 2, the processor adds a 1 to the designated music number i (step S805), and again executes the operations from step S801. On the other hand, if it is judged by the execution of the step S804 that the designated music number is identical with the last music number of the disc 2, the processor restarts the execution of the main routine.

By the procedure described above, the provisional program is edited in accordance with the order of music number of music pieces recorded on the disc.

Figure 16:
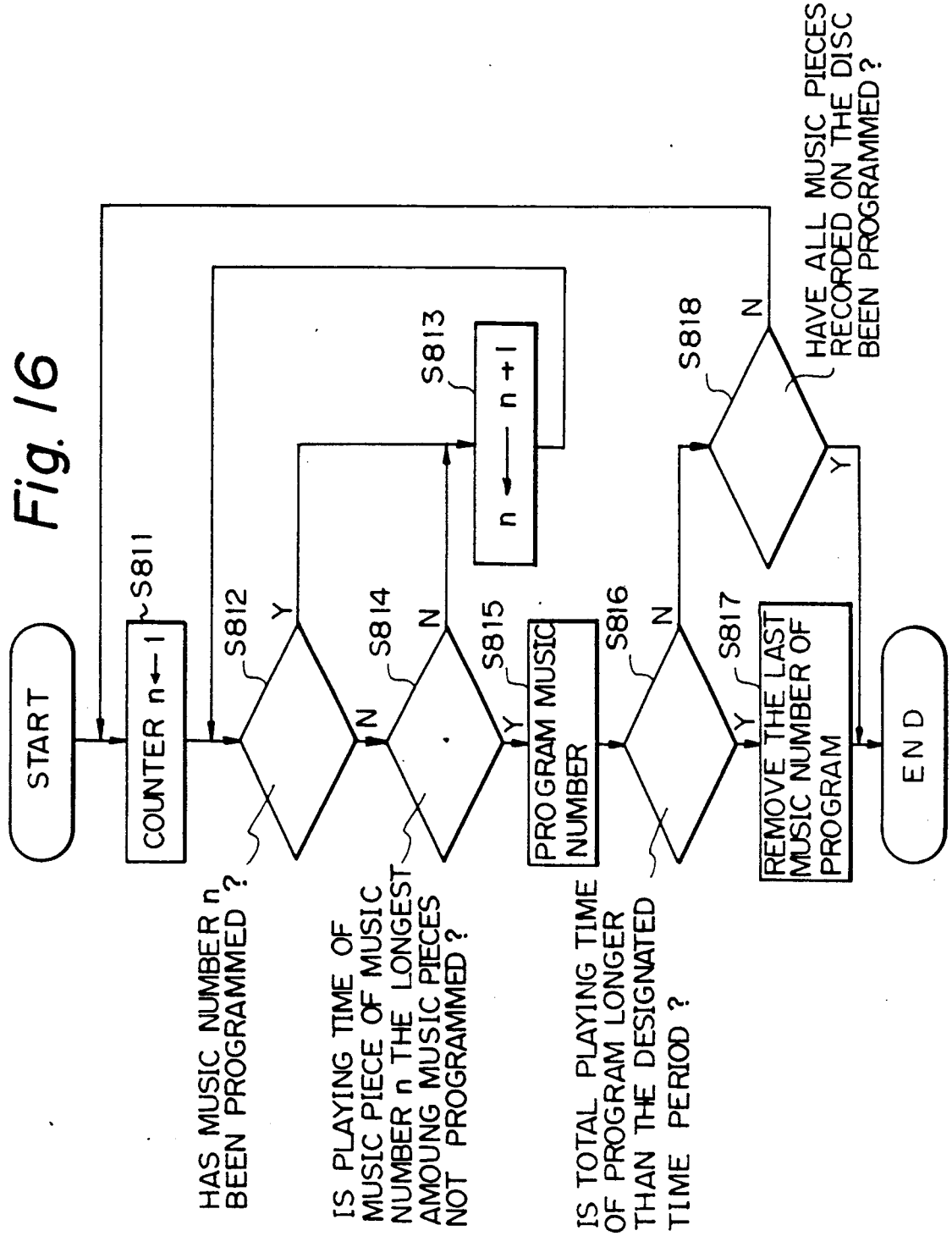

Nextly, in the example shown in FIG. 16, the processor sets a 1 to a count value n (step S811) when the provisional program subroutine is called. Then, the processor judges whether or not the music number n has been already written in the program area of the RAM 18 (step S812). If it is judged by the execution of the step S812 that the music number n has been already written in the program area of the RAM 18, the processor adds a 1 to the count value n (step S813), and again executes the step S812. Conversely, if it is judged by the execution of the step S812 that the music number n has not been written in the program area of the RAM 18, the processor judges whether or not the playing time of the music piece of the music number n is the longest one of the playing times of music pieces which are not written in the program area of the RAM 18 (step S814). If it is judged by the execution of the step S814 that the playing time of the music piece of the music number n is the longest among the music pieces not written in the program area of the RAM 18, then the processor writes the music number n into the program area of the RAM 18 (step S815). Conversely, if it is judged by the execution of the step S814 that the playing time of the music piece of the music number n is not the longest among the music pieces not written in the program area of the RAM 18, the processor again proceeds to step S 813. After the step S815, the processor judges whether or not the summation of the playing times required for playing the music pieces of the music numbers stored in the program area of the RAM 18 is longer than the designated time (step S816). If it is judged that the summation of the playing times is longer than the designated time by the execution of the step S816, the processor removes the last one of the music pieces of the program written in the program area (step S817), and restarts the execution of the main routine. Conversely, if it is judged in step S816 that the summation of the playing times is equal to or shorter than the designated time, the processor judges whether or not all of the music numbers of the disc have been written in the program area (step S818). If it is judged, by the execution of the step S818, that all of the music numbers of the disc 2 have not been written in the program area, the processor again executes the operations from step S812. On the other hand, if it is judged by the execution of the step S818 that all of the music numbers of the disc 2 have been written in the program area, the processor restarts the execution of the main routine.

By the procedure described above, the provisional program is edited in accordance with the descending order of the playing time of the music pieces recorded on the disc. In addition, for editing the provisional program in accordance with the ascending order of the playing time of the music pieces recorded on the disc, it is only necessary to change the operation of step S814 to judge whether or not the playing time of the music piece of the music number n is shortest among the music pieces not included in the program.

Figure 17:
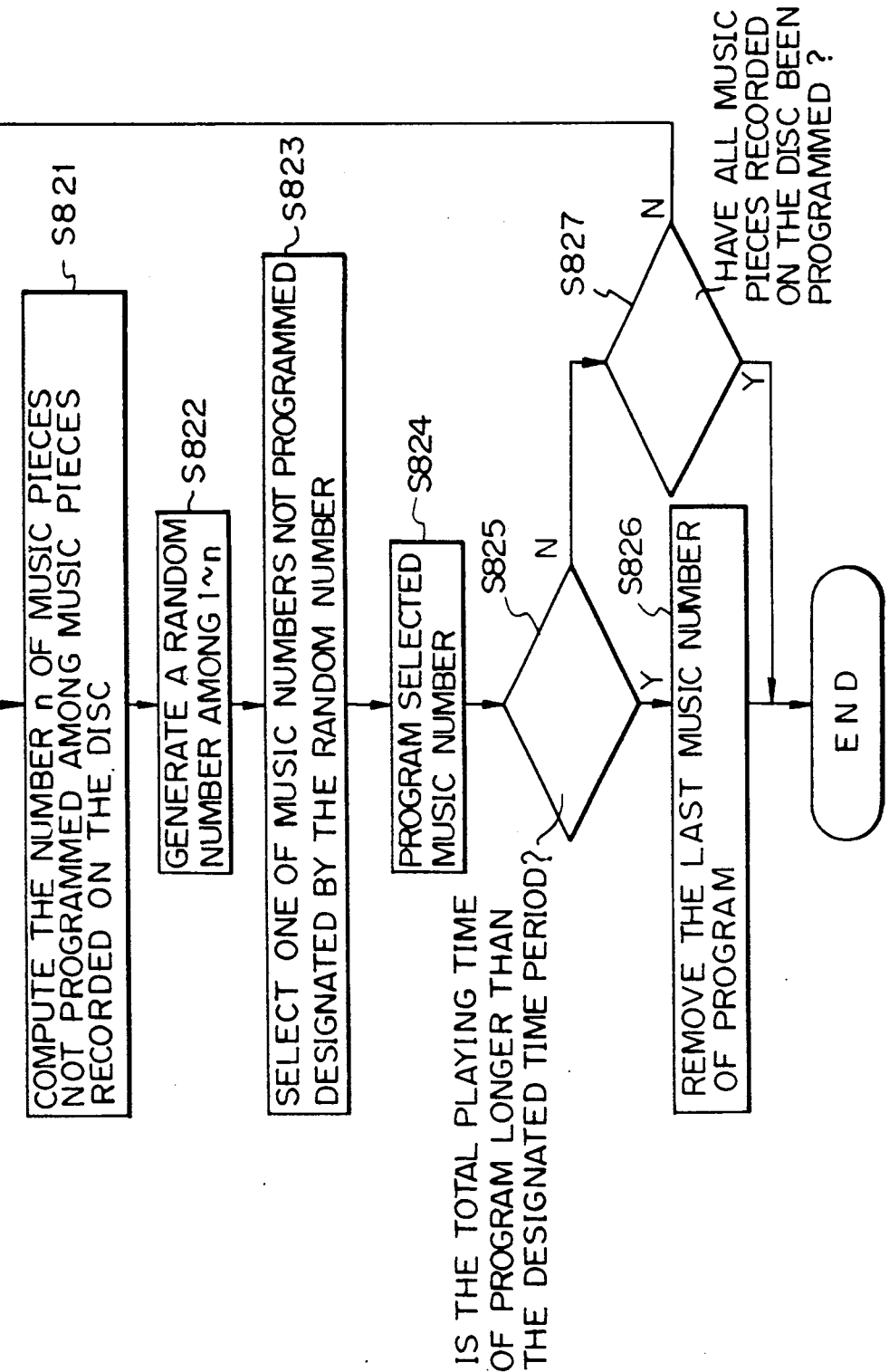

In the example of FIG. 17, the processor computes the number of music pieces not included in the program, that is, the number of music numbers not written in the program area of the RAM 18 (step S821) when the provisional program editing subroutine is called. Subsequently, the processor produces a random number from numbers 1 through n, by using a random number generating means (step S822). Then, the processor selects, from the music numbers not programmed, a music number designated by the random number generated in step S822 (step S823). After this operation the processor writes the music number n into the program area of the RAM 18 (step S824). After the step S824, the processor judges whether or not the summation of the playing times required for playing the music pieces of the music numbers stored in the program area of the RAM 18 is longer than the designated time (step S25). If it is judged that the summation of the playing time is longer than the designated time by the execution of the step S25, the processor removes the last one of the music pieces of the program written in the program area (step S826), and restarts the execution of the main routine. Conversely, if it is judged in step S25 that the summation of the playing times is equal to or shorter than the designated time, the processor judges whether or not all of the music numbers of the disc have been written in the program area (step S827). If it is judged, by the execution of the step S827, that all of the music numbers of the disc 2 have not been written in the program area, the processor again executes the operations from step S821. On the other hand, if it is judged by the execution of the step S827 that all of the music numbers of the disc 2 have been written in the program area, the processor restarts the execution of the main routine.

By the procedure described above, the provisional program is edited in an order set by using a random number generating means.

Figure 18:
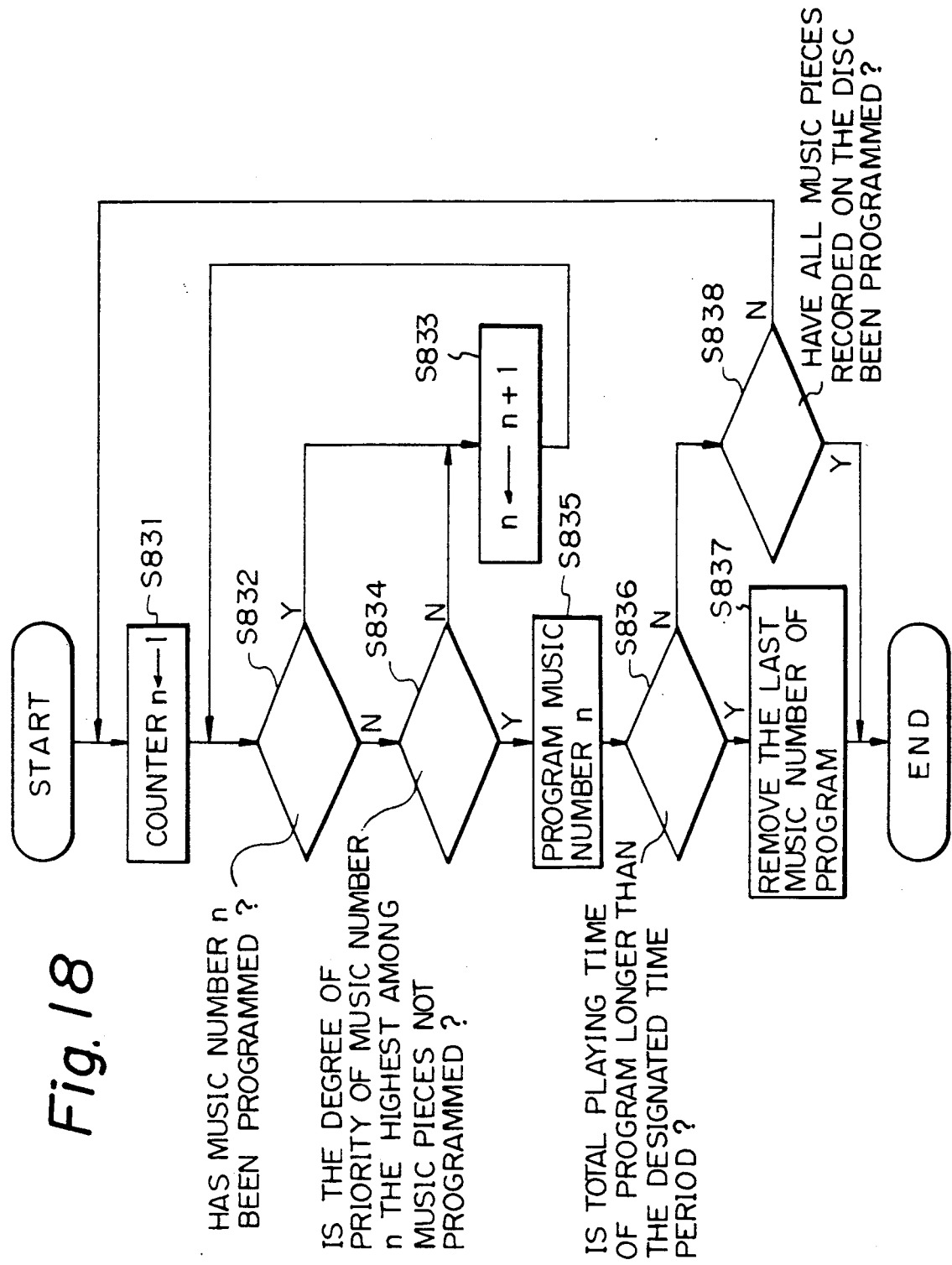

Nextly, in the example shown in FIG. 18, the processor sets a 1 to a count value n (step S831) when the provisional program subroutine is called. Then, the processor judges whether or not the music number n has been already written in the program area of the RAM 18 (step S832). If it is judged by the execution of the step S832 that the music number n has been already written in the program area of the RAM 18, the processor adds a 1 to the count value n (step S833), and again executes the step S832. Conversely, if it is judged by the execution of the step S832 that the music number n has not been written in the program area of the RAM 18, the processor judges whether or not the degree of priority of the music piece of the music number n is the highest one of the playing times of music pieces which are not written in the program area of the RAM 18 (step S834). If it is judged by the execution of the step S834 that the degree of priority of the music piece of the music number n is the highest among the music pieces not written in the program area of the RAM 18, then the processor writes the music number n into the program area of the RAM 18 (step S835). Conversely, if it is judged by the execution of the step S834 that the degree of priority of the music piece of the music number n is not the highest among the music pieces not written in the program area of the RAM 18, the processor again proceeds to step S 833. After the step S835, the processor judges whether or not the summation of the playing times required for playing the music pieces of the music numbers stored in the program area of the RAM 18 is longer than the designated time (step S836). If it is judged that the summation of the playing times is longer than the designated time by the execution of the step S836, the processor removes the last one of the music pieces of the program written in the program area (step S837), and restart the execution of the main routine. Conversely, if it is judged in step S836 that the summation of the playing times is equal to or shorter than the designated time, the processor judges whether or not all of the music numbers of the disc have been written in the program area (step S838). If it is judged, by the execution of the step S838, that all of the music numbers of the disc 2 have not been written in the program area, the processor again executes the operations from step S832. On the other hand, if it is judged by the execution of the step S838 that all of the music numbers of the disc 2 have been written in the program area, the processor restarts the execution of the main routine.

By the procedure described above, the provisional program is edited in accordance with the descending order of the degree of priority of the music pieces recorded on the disc.

Figure 19:
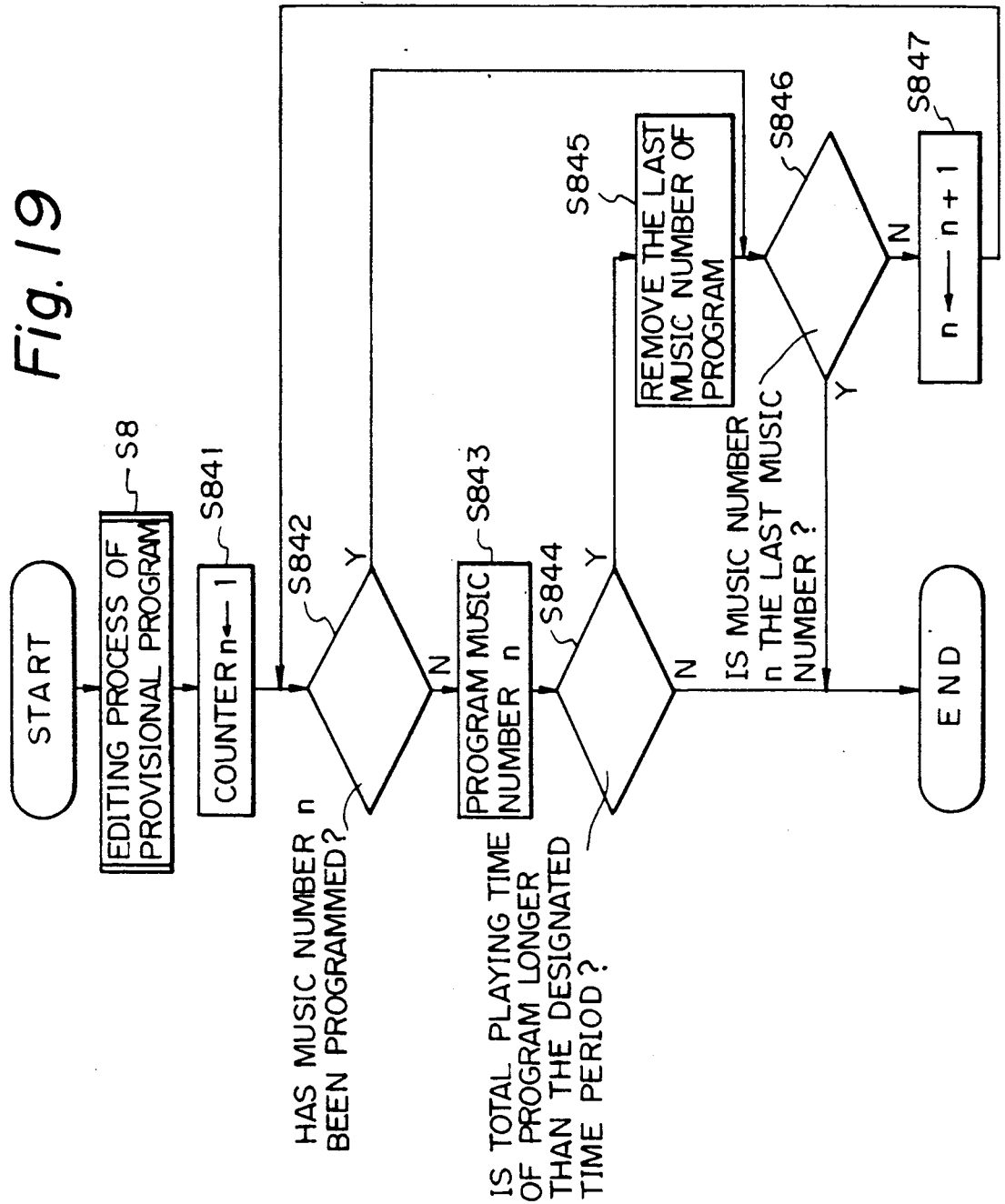

Nextly, a further example of the provisional program editing subroutine is shown in FIG. 19. As shown, after a provisional programs setting subroutine such as shown in one of FIGS. 15 through 18 has been executed, the processor sets a 1 to a count value n (step S841). Then, the processor judges whether or not the music number n has been already written in the program area of the RAM 18 (step S842). If it is judged by the execution of the step S842 that the music number n has not been written in the program area of the RAM 18, the processor writes the music number n in the program area of the RAM 18 (step S843). After the step S843, the processor judges whether or not the summation of the playing times required for playing the music pieces of the music numbers stored in the program area of the RAM 18 is longer than the designated time (step S844). If it is judged that the summation of the playing times is longer than the designated time by the execution of the step S844, the processor removes the last one of the music pieces of the program written in the program area (step S845). After the step S845, the processor judges whether or not the music number n is the last music number of the disc 2 (step S846). The processor also executes the step S846 also when it is judged by the execution of the step S842 that the music number n has been already written in the program area of the RAM 18. If it is judged in step S846 that the music number n is the last music number, the processor restarts the execution of the main routine. Conversely, it it is judged in step S846 that the music number n is not the last music number of the disc 2, the processor adds a 1 to the count value n (step S847), and executed the step S842 again. If it is detected by the execution of the step S844 that the summation of the playing times is equal to or shorter than the designated time, the processor also restarts the execution of the main routine.

By the procedure described above, after editing a provisional combination, a music piece other than the music pieces of the provisional program is alternately selected, and the selected music piece is added to the provisional program to again edit the provisional program when a time period obtained by adding the playing time of the selected music piece to the total playing time of the provisional program becomes equal to or shorter than the designated time period.

As specifically described in the foregoing, in the program editing method and apparatus for an information recording medium playing apparatus according to the present invention, a plurality of music pieces are selected in order and the playing time of each of the selected music pieces is added up, the selected music pieces are edited to produce a provisional combination excluding one of the selected musical programs when the total playing time obtained by the computing process exceeds a designated time period, a combination whose total playing time is the nearest to but shorter than the designated time period is derived by alternately replacing each of the music pieces in the provisional combination with each of music pieces other than the music pieces in the provisional combination, the derived combination determines the playing program, that is, the music pieces to be played. Therefore, it is possible to shorten the silient portion in the end portion of the magnetic tape when the music pieces on a recording medium are edited and recorded on the magnetic tape.

In the foregoing description, the present invention has been described by way of an example in which the editing method of the present invention is embodied in a digital audio disc player. However, this is not limitative, and the present invention can be applied to any apparatus for playing a recording medium on which data relating to the recorded information such as the TOC is recorded. For example, the editing method or apparatus according to the present invention can be embodied in a DAT (digital audio tape) player or recorder in the same way as in the case of the digital audio disc player which has been described in detail.

What is claimed is:

1. A program editing method for an information recording medium playing apparatus for playing back a plurality of music pieces recorded on an information recording medium, said method comprising the steps of:

retrieving playing time information of said plurality of music pieces from the information recording medium, said playing time information representing playing time required for playing each of said plurality of music pieces;

providing a designated time period within which playback of at least some of said plurality of music pieces is desired;

generating a provisional combination of said music pieces for playback comprising a subset of said plurality of music pieces whose total playing time does not exceed said designated time period;

deriving a playback combination of the music pieces whose total playing time is nearest to but shorter than the designated time period by exchanging each of the music pieces in the provisional combination with each music piece not included in the provisional combination; and determining the playback combination to be a playing program of the music pieces.

2. A program editing method as claimed in claim 1, wherein said step of generating the provisional combination comprises selecting all of the music pieces stored on said information recording medium in their sequence of storing and excluding those music pieces which would produce a total playback time that exceeds said designated time period if those music pieces are included in the provisional combination.

3. A program editing method as claimed in claim 1, wherein said step of generating the provisional combination comprises selecting music pieces from said plurality of music pieces in a sequence according to playing times of each of said plurality of music pieces in order of ascending playing times or descending playing times.

4. A program editing method as claimed in claim 1, wherein said step of generating the provisional combination comprises randomly selecting music pieces from said plurality of music pieces.

5. A program editing method as claimed in claim 1, and further comprising the step of assigning a degree of priority to each of said music pieces for playback and wherein said step of generating a provisional combination comprises selecting music pieces from said plurality of music pieces according to the degree of priority assigned to each of said plurality of music pieces so that the music pieces with the highest priority are selected for said provisional combination over music pieces with lower degrees of priority.

6. A program editing method as claimed in claim 1, and further comprising the steps of:
computing a residual time difference between the total playing time of the provisional combination and the designated period of time;
determining if the playing time of any music piece not part of said provisional combination is less than the residual time difference and adding the music piece with the playing time shorter than the residual time difference to the provisional combination.

7. A program editing apparatus for an information recording medium playing apparatus for playing back a plurality of music pieces recorded on an information recording medium, said apparatus comprising:
means for retrieving the playing time information of said plurality of music pieces from the information recording medium, said playing time information representing playing time required for playing each of said plurality of music pieces and computing a total playing time for playback of all of the music pieces;
means for providing a designated time period within which playback of at least some of said plurality of music pieces is desired;
means for generating a provisional combination of said music pieces for playback comprising a subset of said plurality of music pieces whose total playing time does not exceed said designated time period;
means for deriving a playback combination of the music pieces whose total playing time is nearest to but shorter than the designated time period by exchanging each of the music pieces in the provisional combination with each of the music piece not included in the provisional combination; and
means for determining the playback combination to be a playing program.

8. A program editing apparatus as claimed in claim 7, wherein said means for generating forms said provisional combination by selecting music pieces from the plurality of music pieces in an order identical with an order of recording of said plurality of music pieces on said information recording medium.

9. A program editing apparatus as claimed in claim 7, where said means for generating forms said provisional combination by selecting music pieces from said plurality of music pieces in a sequence according to playing times of each of said plurality of music pieces in order of ascending playing times or descending playing times.

10. A program editing apparatus as claimed in claim 7, wherein said means for generating forms said provisional combination by randomly selecting music pieces from said plurality of music pieces recorded on said information recording medium.

11. A program editing apparatus as claimed in claim 7, and further comprising means for assigning a degree of priority to each of said music pieces for playback and wherein said means for generating forms said provisional combination by selecting music pieces from said plurality of music pieces according to the degree of priority assigned to each of said plurality of music pieces so that the music pieces with the highest priority are chosen before music pieces with lower degrees of priority.

12. A program editing apparatus as claimed in claim 7, and further comprising:
means for computing a residual time difference between the total playing time of the provisional combination and the designated period of time;
means for determining if the playing time of any music piece not part of said provisional combination is less than the residual time difference and adding the music piece with the playing time shorter than the residual time difference to the provisional combination.

13. The method of claim 1, and further comprising the steps of:
computing a total playing time for playback of the plurality of music pieces recorded on said information recording medium;
comparing the total playing time for playback of said plurality of music pieces with said designated period of time; and
playing back said plurality of music pieces if said total playing time for said plurality of music pieces is less than said designated period of time.

14. A program editing method for an information recording medium playing apparatus for playing back a plurality of music pieces, the plurality of music pieces being recorded on an information recording medium, the method comprising the steps of:
providing a designated period of time for which playback of at least several of said plurality of music pieces is desired;
retrieving the playing time information of said plurality of music pieces from the information recording medium, said playing time information representing playing time required for playing each of said plurality of music pieces;
generating a provisional combination of said music pieces for playback comprising a subset of said plurality of music pieces whose total playing time is less than said designated time period;
generating a plurality of intermediate combinations by exchanging each of the music pieces in the provisional combination with each music piece of said plurality of music pieces recorded on the information recording medium which are not included in the provisional combination;
computing the total playing time for each of said intermediate combinations;
comparing the total playing time for each of said intermediate combinations with the designated period of time;
selecting as a playback combination from said plurality of intermediate combinations, the intermediate combination whose total playing time is nearest to but shorter than said designated time period.

15. The method of claim 14, and further comprising the step of arranging the music pieces in said playback combination in order according to the sequence of recording on said information recording medium.

16. A program editing method as claimed in claim 14, wherein said step of generating the provisional combination comprises selecting all of the music pieces stored on said information recording medium in their sequence of storing and excluding those music pieces which cause the total playback time for the provisional combination to exceed said designated time period.

17. A program editing method as claimed in claim 14, wherein said step of generating the provisional combination comprises selecting music pieces from said plurality of music pieces in a sequence according to playing times of each of said plurality of music pieces in order of ascending playing times or descending playing times.

18. A program editing method as claimed in claim 14, wherein said step of generating the provisional combination comprises randomly selecting music pieces from said plurality of music pieces stored on said recording medium.

19. A program editing method as claimed in claim 14, and further comprising the step of assigning a degree of priority to each of said music pieces for playback and wherein said step of generating the provisional combination comprises selecting music pieces from said plurality of music pieces according to the degree of priority assigned to each of said plurality of music pieces so that the music pieces with the highest priority are chosen over music pieces with lower degrees of priority.

20. A program editing method as claimed in claim 14, and further comprising the steps of:
   computing a residual time difference between the total playing time of the provisional combination and the designated period of time;
   determining if the playing time of any music piece not part of said provisional combination is less than the residual time difference and adding the music piece with the playing time shorter than the residual time difference to the provisional combination.

21. The method of claim 19, wherein the step of generating a plurality of intermediate combinations comprises the step of maintaining in said playback combination those music pieces assigned with the highest degrees of priority.

22. A program editing apparatus for an information recording medium playing apparatus for playing back a plurality of music pieces, the plurality of music pieces being recorded on an information recording medium, the apparatus comprising:
   means for providing a designated period of time for which playback of at least some of said plurality of music pieces is desired;
   means for retrieving the playing time information of said plurality of music pieces from the information recording medium, said playing time information representing playing time required for playing each of said plurality of music pieces;
   means for generating a provisional combination of said music pieces for playback comprising a subset of said plurality of music pieces whose total playing time is less than said designated time period;
   means for generating a plurality of intermediate combinations by exchanging each of the music pieces in the provisional combination with each music piece of said plurality of music pieces recorded on the information recording medium which are not included in the provisional combination;
   means for computing the total playing time for each of said intermediate combinations;
   means for comparing the total playing time for each of said intermediate combinations with the designated period of time;
   means for selecting as a playback combination from said plurality of intermediate combinations, the intermediate combination whose total playing time is nearest to but shorter than said designated time period.

23. A method programming the playback operation of an information recording medium playing apparatus for playing back a plurality of music pieces, the plurality of music pieces being recorded on an information recording medium, the method comprising the steps of:
   providing a designated period of time corresponding to the recording capacity of each of first and second recording surfaces of a recording medium to which the plurality of music pieces are to be recorded;
   retrieving the playing time information of said plurality of music pieces from the information recording medium, said playing time information representing playing time required for playing each of said plurality of music pieces;
   generating first and second provisional combinations of said music pieces for playback and recording onto the first and second recording surfaces, respectively, of said recording medium, said first and second provisional combinations comprising mutually exclusive subsets of said plurality of music pieces each of which whose total playing time is less than said designated time period;
   generating a plurality of intermediate combinations by exchanging each music piece in the first provisional combination with each music piece in said second provisional combination;
   computing the total playing time for each of said intermediate combinations;
   comparing the total playing time for each of said intermediate combinations with said designated period of time;
   selecting as a first playback combination from said plurality of intermediate combinations and for recording on the first recording surface, the intermediate combination whose total playing time is nearest to but shorter than said designated time period, and selecting as a second playback combination the remaining ones of said music pieces not in said first playback combination.

24. The method as claimed in claim 23, wherein said step of generating the first and second provisional combinations comprises selecting as said first provisional combination all of the music pieces stored on said information recording medium in their sequence of storing excluding those music pieces which have a total playback time that exceeds said designated time period, and selecting as said second provisional combination the remaining music pieces not in said first provisional combination.

25. The method as claimed in claim 23, wherein said step of generating the first and second provisional combinations comprises selecting music pieces from said plurality of music pieces in a sequence according to playing times of each of said plurality of music pieces in order of ascending playing times so that music pieces with shorter playing times are selected for said first provisional combination and music pieces with longer playing times are selected for said second provisional combination.

26. The method as claimed in claim 23, wherein said step of generating the first and second provisional combinations comprises selecting music pieces from said plurality of music pieces in a sequence according to playing times of each of said plurality of music pieces in order of descending playing times so that music pieces with longer playing times are selected for said first provisional combination and music pieces with shorter playing times are selected for said second provisional combination.

27. A program editing method as claimed in claim 23, wherein said step of generating the first and second provisional combinations comprises randomly selecting music pieces from said plurality of music pieces for each of said first and second provisional combinations.

28. A program editing method as claimed in claim 23, and further comprising the step of assigning a degree of priority to each of said music pieces for playback and wherein said step of generating the first and second provisional combinations comprises selecting music pieces from said plurality of music pieces according to the degree of priority assigned to each of said plurality of music pieces so that the music pieces with the highest priority are chosen for the first provisional combination before music pieces with lower degrees of priority.

* * * * *